Patented Oct. 13, 1925.

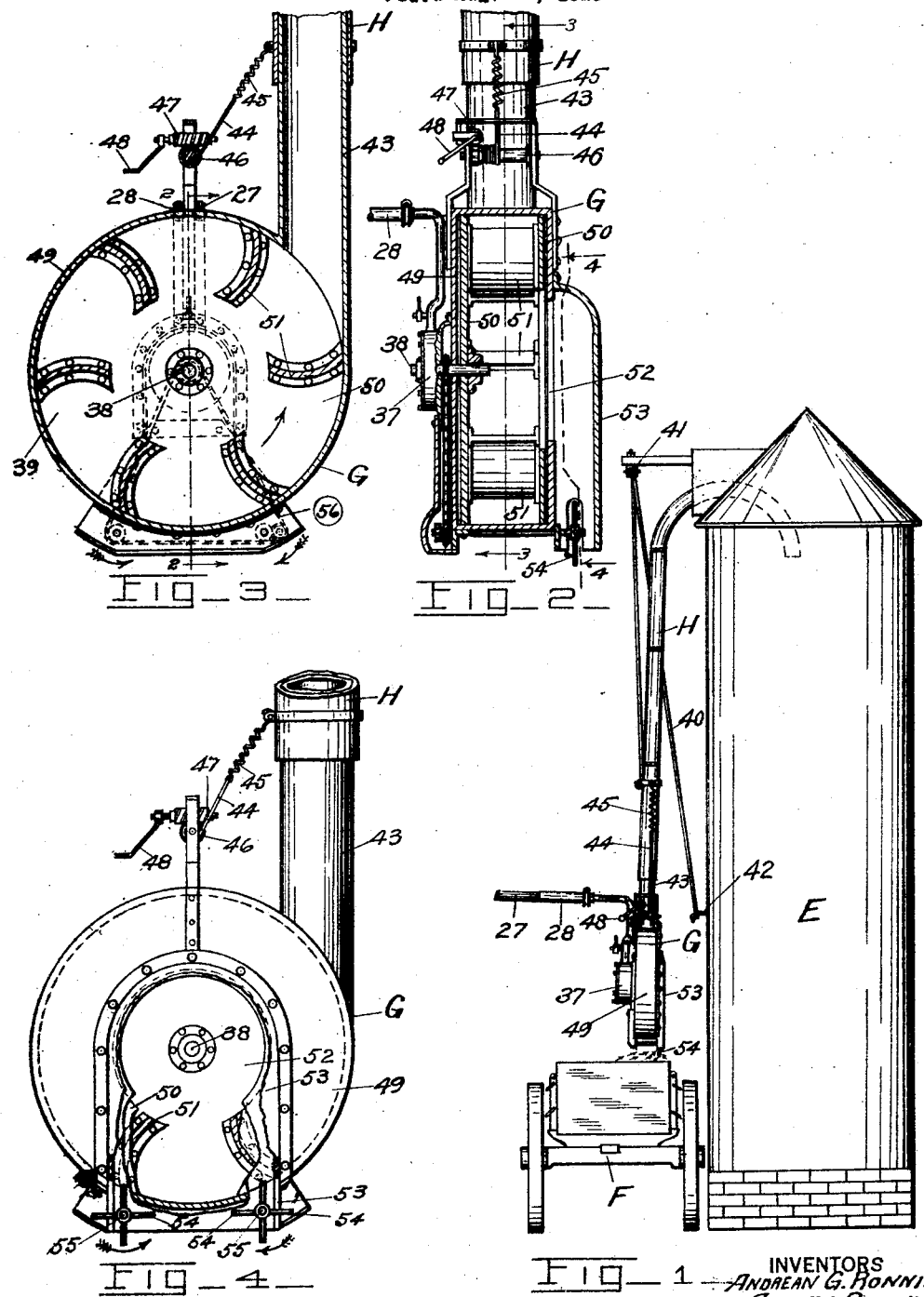

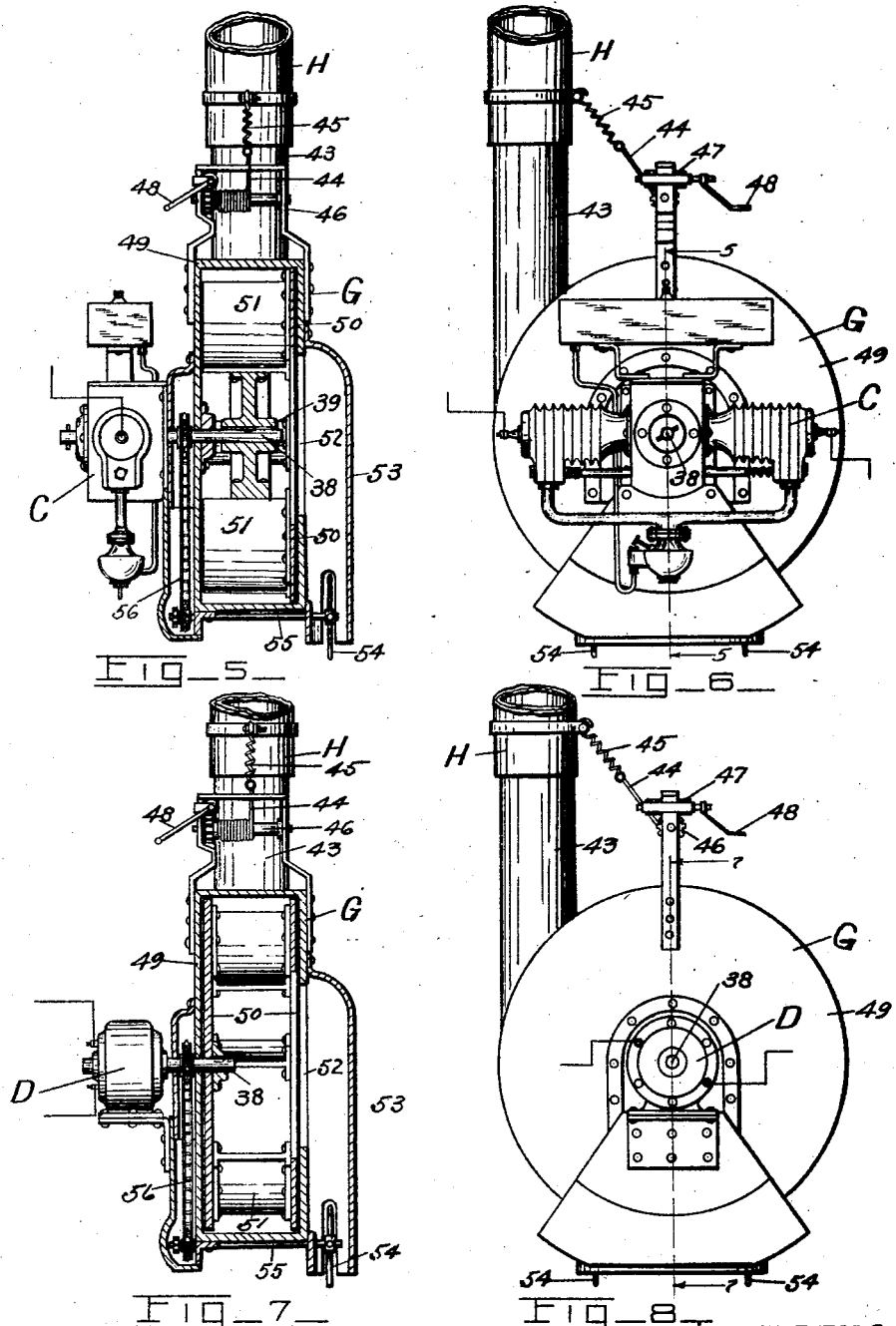

1,556,718

UNITED STATES PATENT OFFICE.

ANDREAN G. RONNING AND ADOLPH RONNING, OF MINNEAPOLIS, MINNESOTA.

PNEUMATIC CONVEYER.

Application filed August 20, 1923. Serial No. 658,364.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Pneumatic Conveyers, of which the following is a specification.

This invention relates to mechanisms for filling silos and the like with cut ensilage, or other fodder or material which is to be elevated from a wagon, truck or other receptacle and up into the silo or other building, and the main object is to provide a novel and practical construction of tubular conveyer and a blower arranged at the lower end thereof, novel means for actuating the blower, and means adjacent to the blower for delivering the material thereto whereby the material may be picked up, delivered to the blower, and from thence impelled through the conveyer and to its ultimate destination in the silo or other building.

Further objects will be disclosed in the course of the following specification, the invention and some modifications being illustrated in the accompanying drawings, wherein:

Fig. 1 is an elevation of a silo and a wagon, showing improved means, embodying our invention, for delivering ensilage from the wagon into the silo.

Fig. 2 is an enlarged vertical section as taken substantially through the center of the blower unit.

Fig. 3 is a sectional elevation as seen substantially on the line 3—3 in Fig. 2.

Fig. 4 is a vertical sectional view as seen on the line 4—4 in Fig. 2.

Fig. 5 is a sectional view similar to Fig. 2, but showing the power unit as arranged to drive the blower shaft directly.

Fig. 6 is a side elevation of the device shown in Fig. 5, and showing the power unit in the form of an opposed gas engine.

Figs. 7 and 8 are respectively similar to Figs. 5 and 6, but an electric motor is substituted as a power unit for the gas engine.

Reference will now be made to the various figures of the drawings by reference characters, like characters indicating like parts in the various figures.

In the device shown in Figs. 1 to 4, inclusive, the blower is provided with and rotated by a rotor or turbine 37, of the fluid operated type. The particular construction of rotor or turbine used is immaterial and may be of any conventional form, although we prefer to use one of the types shown in our co-pending application for patent having Ser. No. 658,363, filed on August 20th, 1923, for power transmission apparatus. This rotor 37 is connected by conduits 27 and 28 through which the operating fluid is circulated. The conduits are preferably flexible and may be of any desired length, their opposite ends of course being connected to a suitable pump or other circulating means (not shown), so that the blower can be operated at all times, with the initial power unit (the pump) operating at a remote distance.

The object of the rotor 37 is to rotate the shaft 38 which rotates a blower 39, but this rotation may also be effected directly by an internal combustion engine C, as shown in Figs. 5 and 6, or by an electric motor D, as shown in Figs. 7 and 8.

As the blower and other ensilage conveying elements are the novel features disclosed in Figs. 1 to 8, inclusive, that structure will now be detailed.

The corn, alfalfa or other product which is to be filled into the silo E is first cut up into suitable ensilage size, by any machine for that purpose, and is hauled up in a wagon or truck F to the side of the silo. The blower unit G picks and sucks the ensilage out of the wagon F and blows it up through a pipe H into the top of the silo F. The pipe H is carried by a rope or cable 40 which passes over a pulley 41 and is attached, at one end, to a cleat or hook 42, so that the position of the pipe H can be adjusted vertically, when so desired. The blower unit G has a tubular member 43 which telescopes with the lower end of the pipe H, so that the blower can be adjusted vertically with respect to the pipe. The blower is adjustably connected to and suspended from the pipe by a cable 44 and a spring 45. The cable is wound upon a small drum 46, rotated by a worm 47 having a crank 48, so that the blower can be readily adjusted. The spring 45 allows the blower to be moved up and down to some extent without the use of the crank 48, and also tends to confine the vibrations of the blower fan and rotor or motor to the blower unit.

The blower unit, in addition to the rotor 37 (or its equivalent) and connections, consists of a main housing 49, in which is rotatably mounted a fan frame 50 in which is secured an annular series of curved fan blades 51.

One side of the housing 49 is provided with a centrally arranged opening 52, over which is arranged a casing 53 whose lower end is open to receive the ensilage. A pair of picker wheels 54 are arranged near the ends of the casing opening and are mounted upon suitably journaled shafts 55 driven by a chain 56 from the shaft 38.

It will thus be readily understood that when the shaft 38 is rotated and the blower unit is lowered into the ensilage material, the picker wheels 54 will agitate the material up into the casing 53, from which it will be drawn and forced through the fan and up into the silo through the pipe H.

It is further understood that suitable modifications may be made in the general design and structural details of the invention as herein disclosed, provided, however, that such modifications come within the spirit and scope of the appended claims. Having now therefore fully shown and described our invention, what we claim to be new and desire to protect by United States Letters Patent is:

1. The combination with a pipe for filling silos and the like, of a blower at the lower end of the pipe and connected therewith, means carried by the blower for delivering material thereto from a relatively lower level, and means for adjusting the position of the blower vertically with respect to the pipe.

2. The combination with a pipe for filling silos and the like, of a blower having a tubular portion telescoping with the filling pipe, and resilient means for suspending the blower from the pipe.

3. The combination with a pipe for filling silos and the like, of a blower having a tubular portion telescoping with the filling pipe, means for adjustably securing the blower with respect to the pipe, and means for adjustably suspending the pipe from and with respect to the silo.

4. A blower of the class described, consisting of a housing having a tangentially arranged outlet, a fan rotatably mounted in the housing, a casing on the side of the housing forming a channel to conduct material to the fan, and picking devices at the lower end of the casing.

5. A blower of the class described, consisting of a vertically adjustable housing, a tubular member, said housing being independently carried and supported by the member, a fan within the housing, means for conducting material to the fan, and means at the lower end of the housing to loosen material conducted to the fan.

6. A device for filling silos and the like consisting of a housing, a tubular member extending from the housing into the silo, a blowing device within the housing adapted to impel material through the tubular member, picking devices at the lower end of the housing, and means for conducting material from the picking devices to the blowing device.

7. A device for filling silos and the like consisting of a housing, a tubular member extending from the housing into the silo, a blowing device within the housing adapted to impel material through the tubular member, picking devices at the lower end of the housing, operative connection between the blowing device and the picking devices, and means for conducting material from the picking devices to the blowing device.

8. The combination with a pipe for filling silos and the like, of a blower having a telescoping connection with the pipe, means for suspending the blower from the pipe, a fan within the blower, and means mounted on the blower to rotate the fan.

9. A device for filling silos from a wagon box or other receptacle adjacent thereto, consisting of a blower having a fan, a tubular member adapted to convey material from the blower into the silo, means for adjustably securing the blower with respect to the receptacle and a power element on the blower and movable therewith to operate the fan.

10. A silo filling device consisting of a housing having a rotary blower and adjustably supported near the silo and tubularly connected wherewith, a power unit arranged on the blower to actuate it, and means for picking up material under the housing and delivering it thereinto and axially to the blower.

11. A device for conveying material from a receptacle and into a silo or the like, consisting of means movably suspended with respect to and over the receptacle for lifting the material vertically therefrom and delivering it to the silo, said means including a pneumatic conveyer and a rotary blower at the lower or receiving end of the conveyer.

In testimony whereof we affix our signatures.

ANDREAN G. RONNING.
ADOLPH RONNING.